United States Patent
Magdalin (10) Patent No.: US 8,990,933 B1
(45) Date of Patent: Mar. 24, 2015

(54) SECURING NETWORKS AGAINST SPEAR PHISHING ATTACKS

(75) Inventor: Vladimir Magdalin, Mountain View, CA (US)

(73) Assignee: Intuit Inc., Mountain View, CA (US)

( * ) Notice: Subject to any disclaimer, the term of this patent is extended or adjusted under 35 U.S.C. 154(b) by 0 days.

(21) Appl. No.: 13/556,892

(22) Filed: Jul. 24, 2012

(51) Int. Cl.
- *G06F 21/00* (2013.01)
- *G06F 21/55* (2013.01)
- *G06F 21/56* (2013.01)

(52) U.S. Cl.
USPC ........ 726/22; 726/2; 726/3; 726/26; 709/229; 709/232

(58) Field of Classification Search
CPC ..... H04L 12/585; H04L 51/12; H04L 61/303; H04L 63/14; H04L 63/201441; H04L 63/1466; H04L 63/1483; H04L 67/02; H04L 67/2814; G06F 17/30861; G06F 21/00; G06F 21/55; G06F 21/56; G06F 2221/2119
USPC ........................ 709/229, 232; 726/2, 3, 22, 26
See application file for complete search history.

(56) References Cited

U.S. PATENT DOCUMENTS

| | | | |
|---|---|---|---|
| 2007/0233643 A1* | 10/2007 | Kang et al. | 707/2 |
| 2008/0162449 A1* | 7/2008 | Chao-Yu et al. | 707/5 |
| 2010/0042931 A1* | 2/2010 | Dixon et al. | 715/738 |
| 2011/0167474 A1* | 7/2011 | Sinha et al. | 726/1 |
| 2011/0276716 A1* | 11/2011 | Coulson et al. | 709/238 |
| 2012/0096553 A1* | 4/2012 | Srivastava et al. | 726/24 |
| 2013/0061038 A1* | 3/2013 | Pao et al. | 713/151 |

FOREIGN PATENT DOCUMENTS

KR          2009001505 A  *  1/2009

* cited by examiner

*Primary Examiner* — Joseph P Hirl
*Assistant Examiner* — Kalish Bell
(74) *Attorney, Agent, or Firm* — Park, Vaughan, Fleming & Dowler LLP; Chia-Hsin Suen (57) ABSTRACT

The disclosed embodiments provide a system that secures a network. During operation, the system obtains a request for a resource from a client connected to the network. Next, the system uses a domain name from the request to obtain one or more properties associated with the domain name and assesses a level of risk associated with the domain name based on the one or more properties. Finally, the system processes the request based on the assessed level of risk.

17 Claims, 4 Drawing Sheets

SECURING NETWORKS AGAINST SPEAR PHISHING ATTACKS

BACKGROUND

Related Art

The disclosed embodiments relate to techniques for facilitating network security. More specifically, the disclosed embodiments relate to techniques for securing networks against spear phishing attacks.

Spear phishing attacks may seek to gain access to account credentials and/or other sensitive data associated with specific individuals and/or organizations. Such spear phishing attacks typically involve the transmission of communications that appear to originate from a trusted source (e.g., within an organization), have information to support the validity of the communications, and have a logical basis for requesting the sensitive data. For example, an attacker may attempt to gain the account credentials of an employee at a company by transmitting an email requesting that the employee navigate to a website that is a clone of the company's internal website and prompts the employee for his/her username and password. The username and password entered by the employee may then be used by the attacker to gain access to the company's internal network and/or confidential business information.

Because spear phishing attacks utilize social engineering techniques that target human users, the spear phishing attacks may bypass multiple countermeasures against other types of hacking attempts. For example, the customization of a spear phishing email and/or website to a specific individual within an organization may prevent detection and/or blocking of the email and/or website by a firewall, filter, and/or blacklist of known "bad" sites and/or traffic. Moreover, unlike phishing attacks, spear phishing attacks are typically not repeated, thus preventing the countermeasures from adapting to subsequent spear phishing attacks after a successful first attack. As a result, spear phishing may represent a greater threat to an organization's security system than other types of hacking attempts. In turn, information and access gained through a spear phishing attack may cause both financial and reputational damage to the organization targeted by the spear phishing attack.

Hence, what is needed is a mechanism for detecting and preventing potential spear phishing attacks.

SUMMARY

The disclosed embodiments provide a system that secures a network. During operation, the system obtains a request for a resource from a client connected to the network. Next, the system uses a domain name from the request to obtain one or more properties associated with the domain name and assesses a level of risk associated with the domain name based on the one or more properties. Finally, the system processes the request based on the assessed level of risk.

In some embodiments, the system also stores the level of risk and the domain name, and processes subsequent requests for the resource based on the stored level of risk.

In some embodiments, processing the request based on the assessed level of risk involves delaying or rejecting the request if the assessed level of risk exceeds a pre-specified threshold, and enabling processing of the request if the assessed level of risk falls below the pre-specified threshold.

In some embodiments, the one or more properties include at least one of:
 (i) an age of the domain name;
 (ii) a similarity of the domain name to a known domain name;
 (iii) a subdomain of the known domain name;
 (iv) a certificate type associated with the domain name;
 (v) an existence of the domain name in an anti-phishing database; and
 (vi) a visual representation of the resource.

In some embodiments, assessing the level of risk associated with the domain name based on the one or more properties involves calculating the level of risk as a sum of numerical risk values associated with the one or more properties.

In some embodiments, assessing the level of risk associated with the domain name based on the one or more properties involves performing a reverse image search using the visual representation, and determining the level of risk based on the reverse image search.

In some embodiments, the domain name is associated with a high level of risk if the reverse image search matches the visual representation to an existing visual representation associated with a different domain name.

In some embodiments, the network includes an intranet.

BRIEF DESCRIPTION OF THE FIGURES

In the figures, like reference numerals refer to the same figure elements.

DETAILED DESCRIPTION

The following description is presented to enable any person skilled in the art to make and use the embodiments, and is provided in the context of a particular application and its requirements. Various modifications to the disclosed embodiments will be readily apparent to those skilled in the art, and the general principles defined herein may be applied to other embodiments and applications without departing from the spirit and scope of the present disclosure. Thus, the present invention is not limited to the embodiments shown, but is to be accorded the widest scope consistent with the principles and features disclosed herein.

The data structures and code described in this detailed description are typically stored on a computer-readable storage medium, which may be any device or medium that can store code and/or data for use by a computer system. The computer-readable storage medium includes, but is not limited to, volatile memory, non-volatile memory, magnetic and optical storage devices such as disk drives, magnetic tape, CDs (compact discs), DVDs (digital versatile discs or digital video discs), or other media capable of storing code and/or data now known or later developed.

The methods and processes described in the detailed description section can be embodied as code and/or data, which can be stored in a computer-readable storage medium as described above. When a computer system reads and executes the code and/or data stored on the computer-readable storage medium, the computer system performs the methods and processes embodied as data structures and code and stored within the computer-readable storage medium.

Furthermore, methods and processes described herein can be included in hardware modules or apparatus. These modules or apparatus may include, but are not limited to, an application-specific integrated circuit (ASIC) chip, a field-programmable gate array (FPGA), a dedicated or shared processor that executes a particular software module or a piece of code at a particular time, and/or other programmable-logic devices now known or later developed. When the hardware modules or apparatus are activated, they perform the methods and processes included within them.

Figure 1:
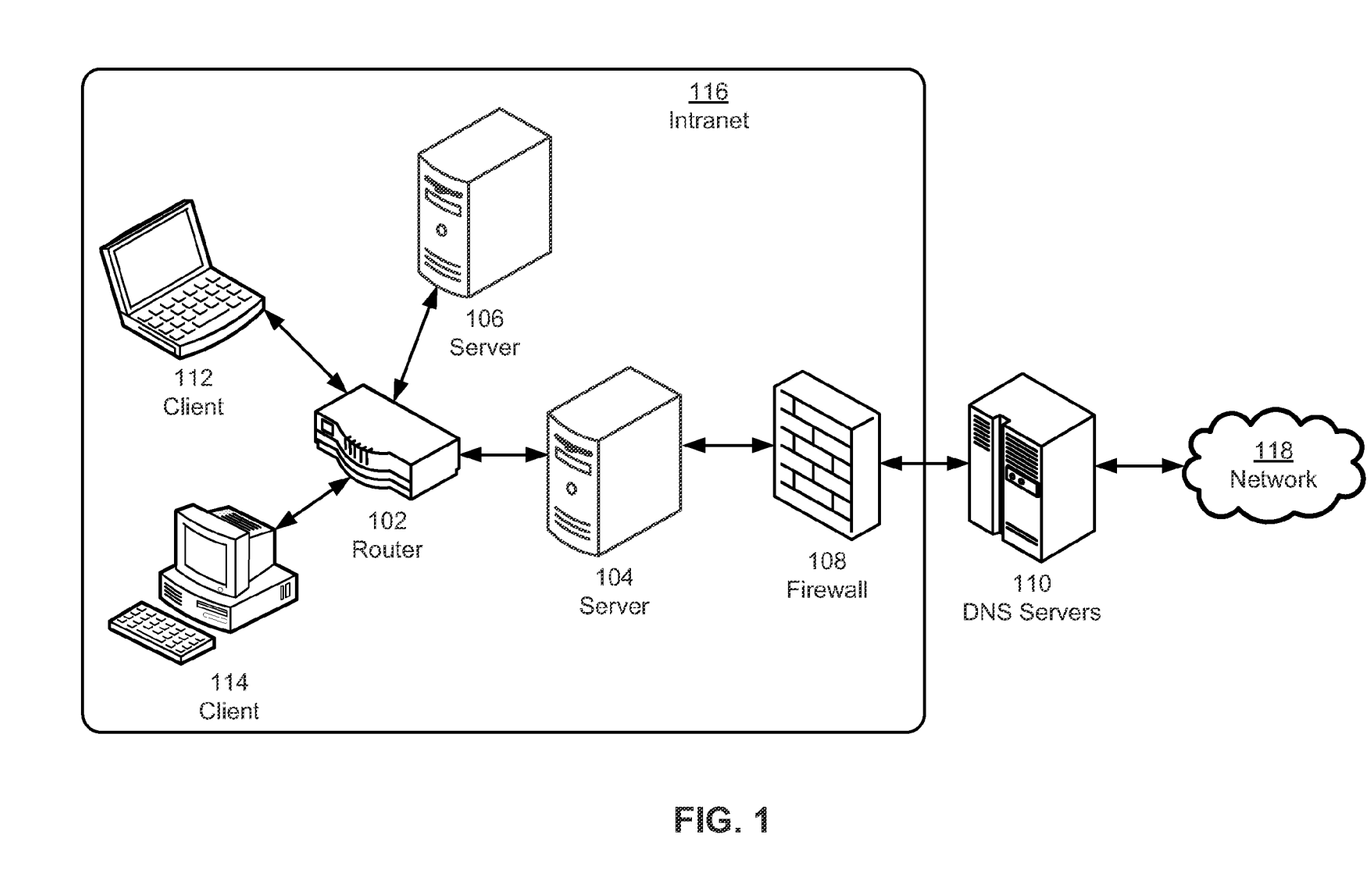
FIG. 1 shows a schematic of a system in accordance with the disclosed embodiments.

The disclosed embodiments provide a method and system for securing a network such as an intranet. As shown in FIG. 1, an intranet 116 may include a number of clients 112-114 that provide one or more services or functions to users, such as mobile phones, personal computers, laptop computers, tablet computers, workstations, and/or other network-enabled electronic devices.

Intranet 116 may correspond to a private computer network that is used to share information, data, and/or resources within an organization. For example, intranet 116 may include the organization's computer infrastructure, internal websites, code and data repositories, classified information, and/or other components related to communication and collaboration within the organization. In addition, one or more components of intranet 116 may be provided by one or more servers 104-106. For example, servers 104-106 may provide web services using HyperText Transfer Protocol (HTTP); email services using Simple Mail Transfer Protocol (SMTP), Post Office Protocol (POP), and/or Internet Message Access Protocol (IMAP); and file transfer services using File Transfer Protocol (FTP) and/or Secure Copy (SCP).

The users may use clients 112-114 to interact with network nodes (e.g., servers 104-106) within intranet 116 and obtain services and/or data provided by the network nodes. The users may also use clients 112-114 and/or intranet 116 to access an external network 118 such as the Internet. For example, the users may use clients 112-114 and intranet 116 to send and receive emails, retrieve webpages, access online user accounts, stream audio and/or video, and/or transfer files with other clients and/or servers on intranet 116 and/or external network 118. Such interaction may be enabled through network connections between clients 112-114 and intranet 116. For example, a client (e.g., clients 112-114) may access intranet 116 through a wired (e.g., Ethernet) connection with a router 102 in intranet 116. Alternatively, the client may wirelessly or remotely connect to intranet 116 through a wireless access point and/or another network, such as network 118.

Those skilled in the art will appreciate that intranet 116 may include data and/or resources specific to the organization and/or one or more members of the organization. For example, intranet 116 may store sensitive information related to employees, trade secrets, products, and/or research and development. Similarly, intranet 116 may also allow access to organization-specific resources (e.g., applications, computing resources, user accounts, etc.) associated with communication, collaboration, management, business operations, and/or other tools that facilitate productivity.

Consequently, access to intranet 116 may be limited only to authorized users, such as members (e.g., employees) of the organization associated with intranet 116. In addition, limited access to intranet 116 may be enforced by a set of security measures, such as a firewall 108, software filters, virtual private networks (VPNs), user authentication, certification authorities, smart cards, and/or security tokens, which are configured to prevent access to the data and resources of intranet 116 by unauthorized users and/or computing devices.

However, security measures associated with intranet 116 may be bypassed by spear phishing attacks that target human users within the organization. For example, a spear phishing attack may transmit an email to a user of a client (e.g., clients 112-114) in intranet 116. The email may appear to come from a trusted source within the organization and request that the user navigate to a website that appears to be the organization's internal website (e.g., on intranet 116) but is located at a domain name that is a misspelling of the internal website's domain name. The website may then prompt the user to enter his/her account credentials with the organization, thus gaining access to the user's account if the user does not recognize the false nature of the email and/or website and provides the account credentials to the website. Moreover, the email and/or website may pass through firewall 108 and/or other security measures in intranet 116 undetected because the spear phishing attack is customized to the user and/or organization and performed only once, whereas the security measures operate based on known characteristics of hacking attempts, such as blacklists of previously established "bad" websites and/or content.

In one or more embodiments, the system of FIG. 1 includes functionality to detect and block spear phishing attacks that target users within intranet 116. More specifically, server 104 may intercept requests from clients 112-114 for resources such as files and/or webpages from network 118. Next, server 104 may use a domain name from each request to obtain one or more properties associated with the domain name from one or more domain name system (DNS) servers 110. Server 104 may then assess the level of risk associated with the domain name based on the properties and process the request based on the assessed level of risk. For example, server 104 may enable processing of the request by a server outside intranet 116 if the level of risk falls below a pre-specified threshold. On the other hand, server 104 may delay or reject the request if the level of risk exceeds the pre-specified threshold. Detecting and blocking of spear phishing attacks is discussed in further detail below with respect to FIG. 2.

Figure 2:
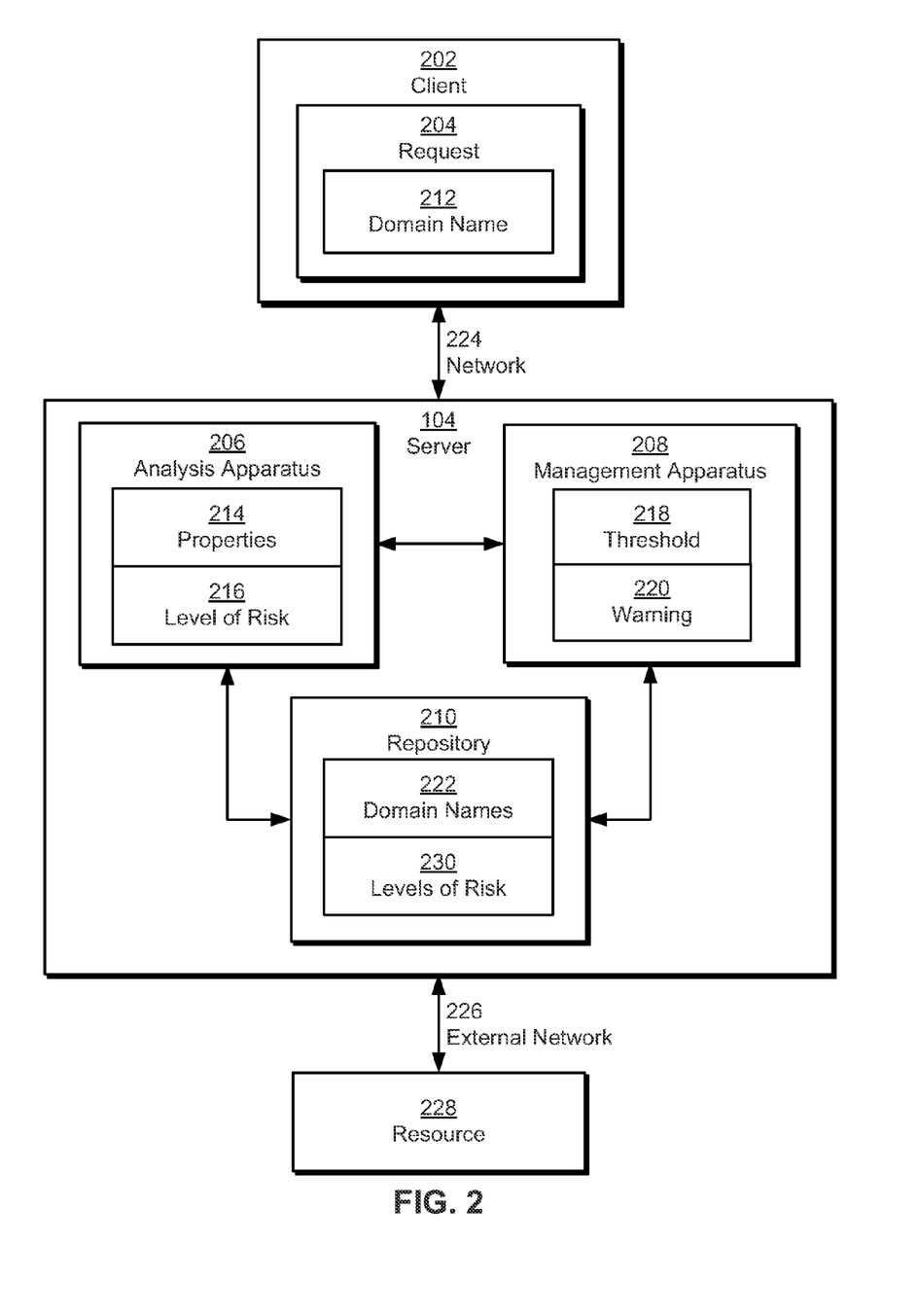
FIG. 2 shows a system for securing a network in accordance with the disclosed embodiments.

FIG. 2 shows a system for securing a network 224 in accordance with the disclosed embodiments. As mentioned above, network 224 may be an intranet, such as intranet 116 of FIG. 1. Alternatively, network 224 may be a local area network (LAN), personal area network (PAN), wireless network, distributed network, peer-to-peer network, and/or other type of computer and/or communications network.

As shown in FIG. 2, network 224 may connect a client 202 and server 104. Client 202 may perform tasks for a user by transmitting a request 204 for a resource 228 such as a webpage, file, document, and/or service over network 224. For example, request 204 may be a HyperText Transfer Protocol (HTTP) request, a HyperText Transfer Protocol Secure (HTTPS) request, a File Transfer Protocol (FTP) request, a Secure Shell (SSH) request, and/or a Virtual Private Network (VPN) request.

Server 104 may receive request 204 before request 204 is transmitted over an external network 226 (e.g., the Internet). For example, server 104 may receive all outbound traffic from client 202 and/or other clients on network 224 before the traffic is transmitted over an external network 226 such as the Internet.

In one or more embodiments, server 104 secures network 224 against phishing or spear phishing attacks by examining request 204 for signs of a possible phishing or spear phishing attack and managing request 204 accordingly. First, an analysis apparatus 206 in server 104 may use a domain name 212 from request 204 to obtain one or more properties 214 associated with domain name 212 and/or resource 228. For example, analysis apparatus 206 may use domain name 212 to obtain WHOIS data, DNS records, and/or other data associated with domain name 212. Analysis apparatus 206 may then examine the data for properties 214 such as the age of domain name 212, a certificate type (e.g., of an SSL certificate) associated with domain name 212, the existence of domain name 212 in an anti-phishing database, the similarity of domain name 212 to a known domain name (e.g., a domain name of network 224), and/or the presence of a subdomain of a known domain name within domain name 212.

Next, analysis apparatus 206 may assess a level of risk 216 associated with domain name 212 based on properties 214. Level of risk 216 may be calculated as a sum of numerical risk values associated with properties 214. For example, analysis apparatus 206 may assign a numerical risk value to the age of domain name 212 by producing a high risk value for a younger domain name 212 (e.g., less than 30 days old) and lowering the risk value as the age of domain name 212 increases. Similarly, analysis apparatus 206 may assign a numerical risk value to an SSL certificate associated with domain name 212 by generating a higher risk value for a certificate from a cheaper and/or less reputable certificate authority and a lower risk value for a certificate from a more expensive and/or reputable certificate authority.

Analysis apparatus 206 may also assign a numerical risk value related to the presence of domain name 212 in an anti-phishing database by producing an extremely high risk value if domain name 212 is found in an anti-phishing database and a zero risk value if domain name 212 is not found in any anti-phishing databases. In addition, analysis apparatus 206 may assign a numerical risk value for the similarity of domain name 212 to a known domain name by generating a high risk value if domain name 212 is highly similar to (e.g., is a misspelling of) a known domain name and a zero risk value if domain name 212 does not resemble a known domain name. Analysis apparatus 206 may further assign a numerical risk value for a subdomain of a known domain name by producing a moderate risk value if domain name 212 includes a subdomain of a known domain name, which disguises the true source of resource 228. Conversely, analysis apparatus 206 may produce a zero risk value for the subdomain of the known domain name if domain name 212 does not include a subdomain of a known domain name. Finally, analysis apparatus 206 may add up the assigned numerical risk values to obtain level of risk 216.

Once level of risk 216 is calculated, a management apparatus 208 in server 104 may process request 204 based on level of risk 216. In particular, management apparatus 208 may compare level of risk 216 to a pre-specified threshold 218. For example, management apparatus 208 may compare a numeric value for level of risk 216 to a numerical threshold 218 of acceptable risk for network 224. If level of risk 216 exceeds threshold 218, management apparatus 208 may delay or reject request 204. For example, management apparatus 208 may prevent transmission of request 204 over network 224 and/or transmit a warning 220 and/or error message to client 202 notifying the user of client 202 of a high level of risk associated with request 204.

If level of risk 216 falls below threshold 218, management apparatus 208 may enable processing of request 204. For example, management apparatus 208 may transmit request 204 over external network 226 so that request 204 may be received by a server and/or other network node associated with resource 228. The server and/or network node may then fulfill request 204 by transmitting resource 228 to client 202.

Numerical values for threshold 218, level of risk 216, and/or individual properties 214 may thus be tuned to allow and/or exclude specific properties 214 from domain name 212 and/or other domain names that are accessible from client 202 and/or network 224. For example, threshold 218 may be adjusted up or down to increase or decrease the level of sensitivity of server 104 to potential phishing and/or spear phishing attacks. Moreover, a risk value for a recently registered domain name 212, the presence of domain name 212 in an anti-phishing database, and/or a strong resemblance of domain name 212 to a known domain name may be weighted highly enough to trigger the automatic rejection of request 204 by management apparatus 208. On the other hand, low to moderate risk values associated with a slightly older domain name 212, a less reputable certificate authority, and/or a subdomain of a known domain name may be assessed on a case-by-case basis by analysis apparatus 206 and/or management apparatus 208. The lower risk values may also prompt the transmission of warning 220 to client 202 but not the outright rejection of request 204.

Once level of risk 216 is ascertained for domain name 212, level of risk 216 and domain name 212 may be stored in a repository 210 by analysis apparatus 206 and/or management apparatus 208 for use in processing subsequent requests for resource 228. For example, repository 210 may include domain names 222 and associated levels of risk 230 for all unique domain names from requests previously received by server 104. Repository 210 may also be pre-populated with a "white list" of known domain names that can be safely accessed from network 224. In turn, the stored domain names 222, levels of risk 230, and known domain names may be used by analysis apparatus 206 and/or management apparatus 208 to process requests for resources without reassessing levels of risk 230 for domain names 222 and/or the known domain names, thus expediting processing of the requests by server 104.

In one or more embodiments, properties 214 also include a visual representation of resource 228 that is used in a separate assessment of level of risk 216. For example, analysis apparatus 206 may recalculate level of risk 216 based on the visual representation of resource 228 if an initial assessment of level of risk 216 based on other properties 214 (e.g., age of domain name 212, similarity to a known domain name, a subdomain of the known domain name, certificate type, existence in anti-phishing database) is inconclusive. Alternatively, analysis apparatus 206 may assess level of risk 216 using the visual representation of resource 228 independently and/or in lieu of numerical risk values associated with the other properties 214.

More specifically, analysis apparatus 206 may obtain resource 228 (e.g., by transmitting request 204 or a similar request over external network 226) and render the visual representation from resource 228 (e.g., as a screenshot). Analysis apparatus 206 may then perform a reverse image search using the visual representation of resource 228 and determine level of risk 216 based on the reverse image search. For example, analysis apparatus 206 may attempt to match the visual representation of resource 228 to existing visual representations (e.g., screenshots) of known and/or popular websites, such as a website requiring a login and password and/or an internal website accessible within network 224. If the reverse image search matches the visual representation to an existing visual representation associated with a different domain name (e.g., a legitimate website), analysis apparatus 206 may determine that domain name 212 is likely used in a phishing or spear phishing attack and assign an extremely high level of risk 216 to domain name 212. Management apparatus 208 may then prevent the attack from succeeding by rejecting request 204 and transmitting warning 220 to client 202 and/or other clients on network 224.

Such analysis of properties (e.g., properties 214) of resources on external network 226 may allow analysis apparatus 206 and management apparatus 208 to detect potential phishing and/or spear phishing attacks on clients (e.g., client 202) of network 224, even if the attacks are first attempts. In turn, analysis apparatus 206 and management apparatus 208 may provide a better defense against phishing and/or spear phishing attacks than countermeasures that rely on known threats and/or attacks, such as firewalls, software filters, and/or intrusion prevention systems.

Those skilled in the art will appreciate that the system of FIG. 2 may be implemented in a variety of ways. First, analysis apparatus 206, management apparatus 208, and repository 210 may be provided by one or more servers (e.g., server 104), hosts, and/or software components. For example, analysis apparatus 206, management apparatus 208, and repository 210 may be implemented by a single server and/or component, or analysis apparatus 206, management apparatus 208, and repository may be provided by a combination of servers and/or components.

Second, the functionality of server 104 may be used to secure various types of networks. As mentioned above, server 104 may be used to prevent phishing and/or spear phishing attacks on clients within an intranet. Alternatively, server 104 may be provided by an Internet service provider (ISP) and/or DNS provider to help protect customers of the ISP and/or DNS provider from phishing attacks.

Finally, the behavior of analysis apparatus 206 and/or management apparatus 208 may be adjusted based on the security level of network 224 and/or to facilitate timely responses to requests (e.g., request 204) by clients (e.g., 202) on network 224. For example, level of risk 216 may be assessed using both a sum of numerical risk values of properties 214 and a reverse image search of the visual representation of resource 228 if client 202 and/or network 224 contain highly sensitive data. On the other hand, only one assessment of level of risk 216 and/or a calculation of level of risk 216 using fewer properties 214 (e.g., age of domain name 212 and/or similarity to a known domain name) may be made to facilitate speedy processing of requests for valid resources. To further reduce delay associated with receipt of requested resources by the clients, analysis apparatus 206 and/or management apparatus 208 may enable the transmission of the requests over external network 226 while asynchronously assessing levels of risk for the requests. If a request is associated with a high level of risk, management apparatus 208 may block transmission of the resource associated with the request to the corresponding client and transmit a warning (e.g., warning 220) and/or error message to the client. If the request is not associated with a high level of risk, management apparatus 208 may allow the client to continue receiving the resource, thus minimizing the impact of server 104 on processing of the request by a network node on external network 226.

Figure 3:
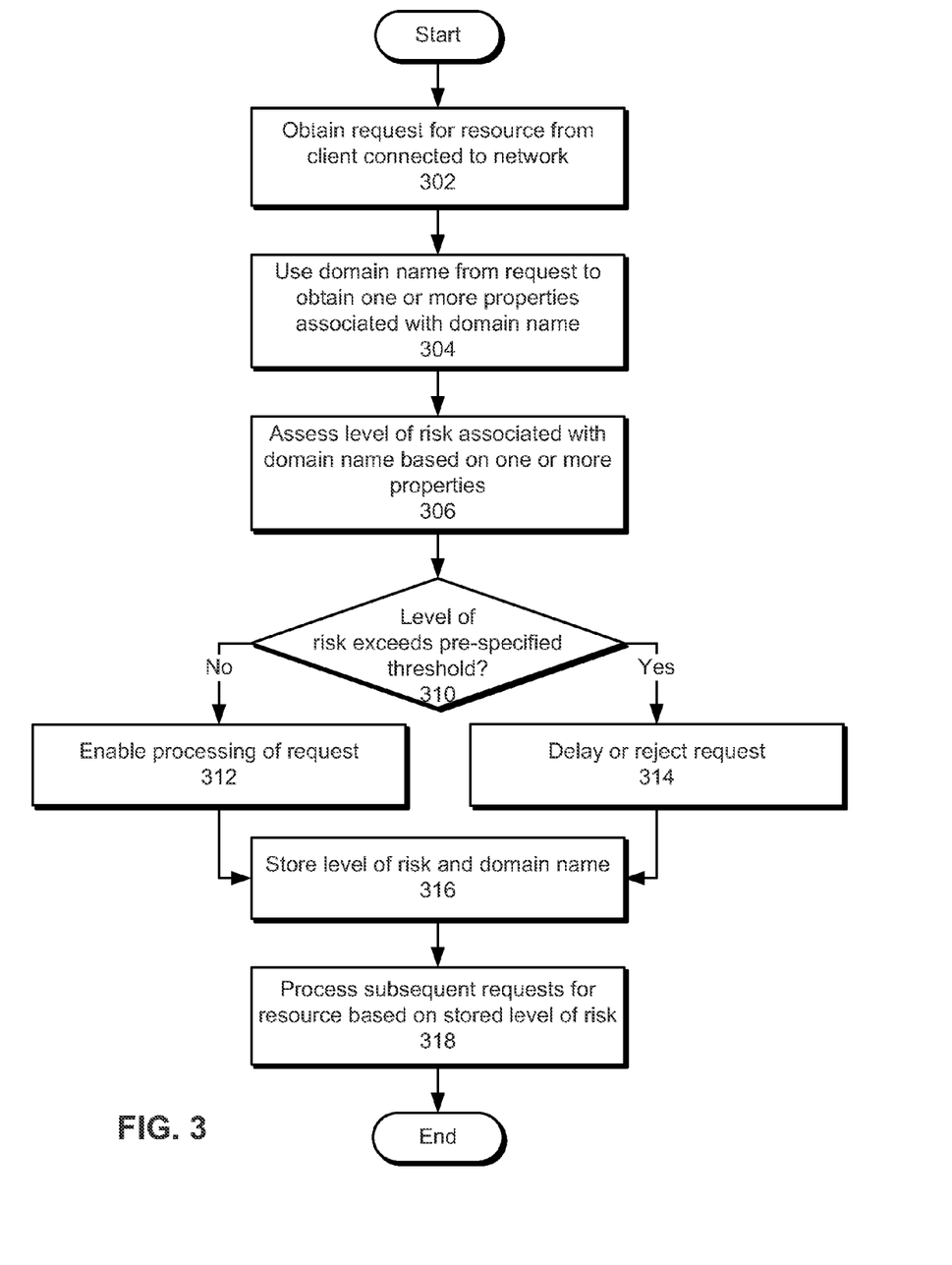
FIG. 3 shows a flowchart illustrating the process of securing a network in accordance with the disclosed embodiments.

FIG. 3 shows a flowchart illustrating the process of securing a network in accordance with the disclosed embodiments. In one or more embodiments, one or more of the steps may be omitted, repeated, and/or performed in a different order. Accordingly, the specific arrangement of steps shown in FIG. 3 should not be construed as limiting the scope of the embodiments.

Initially, a request for a resource is obtained from a client connected to the network (operation 302). The request may be an HTTP request, HTTPS request, FTP request, SSH request, VPN request, and/or other type of network request for a resource such as a webpage, file, document, and/or service. Next, a domain name from the request is used to obtain one or more properties associated with the domain name (operation 304). For example, the domain name may be used to retrieve WHOIS data, DNS records, and/or other data associated with the domain name and/or similar domain names. Properties such as the age of the domain name, a similarity of the domain name to a known domain name, a subdomain of the known domain name, a certificate type associated with the domain name, an existence of the domain name in an anti-phishing database, and/or a visual representation of the resource may then be obtained from the data.

A level of risk associated with the domain name is assessed based on the properties (operation 306). For example, the level of risk may be calculated as a sum of numerical risk values associated with the properties. The level of risk may also be separately determined based on a reverse image search using the visual representation of the resource, with a high level of risk found if the reverse image search matches the visual representation to an existing visual representation associated with a different domain name.

The request may then be processed based on the assessed level of risk. In particular, the level of risk may be compared to a pre-specified threshold (operation 310). If the level of risk exceeds the pre-specified threshold, the request is delayed or rejected (operation 314). For example, a warning and/or error message may be transmitted to the client, and the request may be discarded to protect the client from a possible phishing and/or spear phishing attack. If the level of risk does not exceed the pre-specified threshold, processing of the request is enabled (operation 312). For example, the request may be transmitted over an external network such as the Internet to enable receipt of the resource by the client from the external network.

The level of risk and domain name may also be stored (operation 316), and subsequent requests for the resource may be processed based on the stored level of risk (operation 318). For example, the level of risk and domain name may be stored in a repository along with other levels of risk and corresponding domain names. The stored levels of risk and domain names may then be used to process requests containing the domain names without reassessing the levels of risk, thus expediting processing of the requests and/or detection of potential spear phishing and/or phishing attacks associated with the requests.

Figure 4:
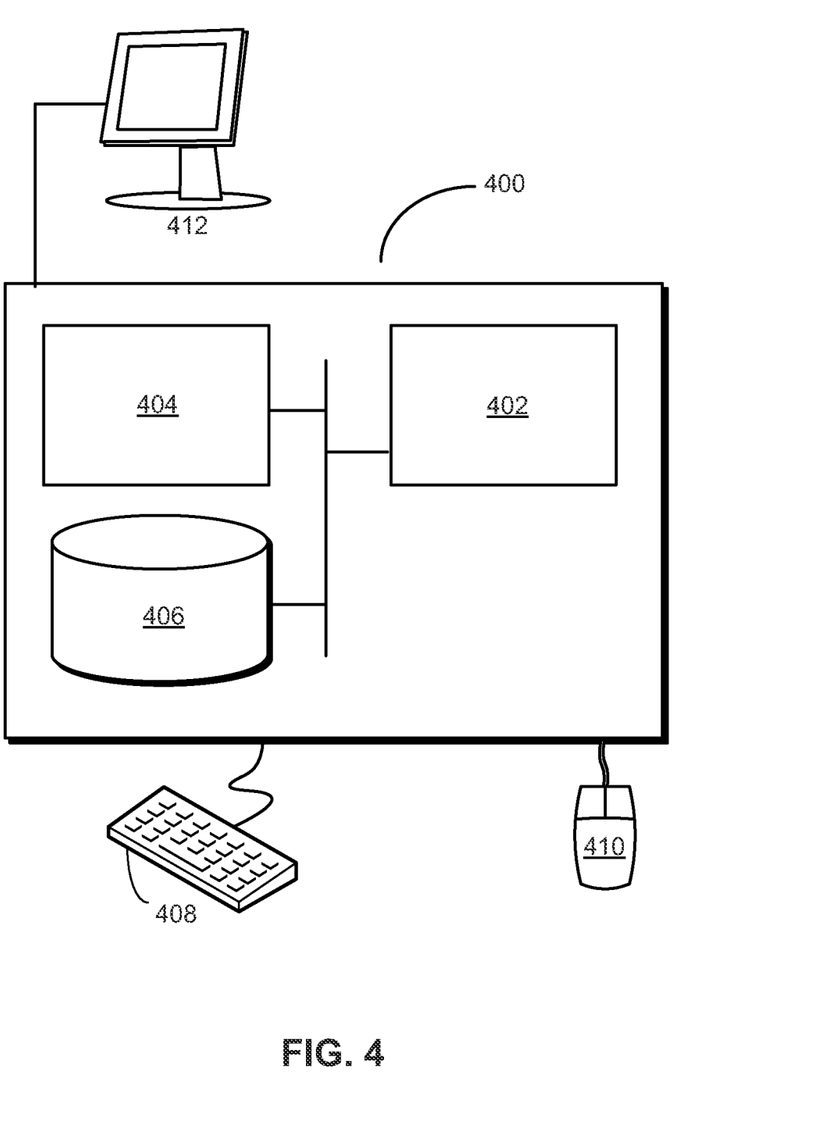
FIG. 4 shows a computer system in accordance with the disclosed embodiments.

FIG. 4 shows a computer system 400 in accordance with the disclosed embodiments. Computer system 400 includes a processor 402, memory 404, storage 406, and/or other components found in electronic computing devices. Processor 402 may support parallel processing and/or multi-threaded operation with other processors in computer system 400. Computer system 400 may also include input/output (I/O) devices such as a keyboard 408, a mouse 410, and a display 412.

Computer system 400 may include functionality to execute various components of the present embodiments. In particular, computer system 400 may include an operating system (not shown) that coordinates the use of hardware and software resources on computer system 400, as well as one or more applications that perform specialized tasks for the user. To perform tasks for the user, applications may obtain the use of hardware resources on computer system 400 from the operating system, as well as interact with the user through a hardware and/or software framework provided by the operating system.

In one or more embodiments, computer system 400 provides a system for securing a network such as an intranet. The system may include an analysis apparatus that obtains a request for a resource from a client connected to the network and uses a domain name from the request to obtain one or more properties associated with the domain name. The analysis apparatus may also assess a level of risk associated with the domain name based on the one or more properties. The system may also include a management apparatus that processes the request based on the assessed level of risk.

In addition, one or more components of computer system 400 may be remotely located and connected to the other components over a network. Portions of the present embodiments (e.g., analysis apparatus, management apparatus, server, etc.) may also be located on different nodes of a distributed system that implements the embodiments. For example, the present embodiments may be implemented using a cloud computing system that secures a remote network against phishing and/or spear phishing attacks.

The foregoing descriptions of various embodiments have been presented only for purposes of illustration and description. They are not intended to be exhaustive or to limit the present invention to the forms disclosed. Accordingly, many modifications and variations will be apparent to practitioners skilled in the art. Additionally, the above disclosure is not intended to limit the present invention.

What is claimed is:

1. A computer-implemented method for securing a network, comprising:
    obtaining a request for a resource from a client connected to the network;
    using a domain name from the request to obtain one or more properties associated with the domain name, wherein the one or more properties comprise a visual representation of the resource, and wherein obtaining the visual representation of the resource involves:
        transmitting a request for the resource over an external network;
        receiving the resource; and
        generating a rendered screenshot of the received resource;
    assessing, by computer, a level of risk associated with the domain name based on the one or more properties, wherein assessing the level of risk involves:
    performing a reverse image search by comparing the rendered screenshot to a database of rendered screenshots of websites, each of the websites associated with a different domain name that is different from the domain name from the request;
    determining the level of risk based on the reverse image search; and
    calculating the level of risk as a sum of numerical risk values associated with the one or more properties; and
    processing the request based on the assessed level of risk.

2. The computer-implemented method of claim 1, further comprising:
    storing the level of risk and the domain name; and
    processing subsequent requests for the resource based on the stored level of risk.

3. The computer-implemented method of claim 1, wherein processing the request based on the assessed level of risk involves:
    if the assessed level of risk exceeds a pre-specified threshold, delaying or rejecting the request; and
    if the assessed level of risk falls below the pre-specified threshold, enabling processing of the request.

4. The computer-implemented method of claim 1, wherein the one or more properties further comprise at least one of:
    an age of the domain name;
    a similarity of the domain name to a known domain name;
    a certificate type associated with the domain name; and
    an existence of the domain name in an anti-phishing database.

5. The computer-implemented method of claim 1, wherein the domain name is associated with a high level of risk if the 1 reverse image search matches the obtained visual representation to an existing 2 visual representation associated with a different domain name.

6. The computer-implemented method of claim 1, wherein the network comprises an intranet.

7. A system for securing a network, comprising:
    a processor;
    a memory storing instructions that are executable by the processor, the instructions comprising:
    instructions for obtaining a request for a resource from a client connected to the network;
    instructions for using a domain name from the request to obtain one or more properties associated with the domain name, wherein the one or more properties comprise a visual representation of the resource, and wherein obtaining the visual representation of the resource involves:
        transmitting a request for the resource over an external network;
        receiving the resource; and
        generating a rendered screenshot of the received resource; and
    instructions for assessing a level of risk associated with the domain name based on the one or more properties, wherein assessing the level of risk involves:
        performing a reverse image search by comparing the rendered screenshot to a database of rendered screenshots of websites each of the websites associated with a different domain name that is different from the domain name from the request;
        determining the level of risk based on the reverse image 24 search; and
        calculating the level of risk as a sum of numerical risk values associated with the one or more properties; and
    instructions for processing the request based on the assessed level of risk.

8. The system of claim 7, further comprising:
    instructions for storing the level of risk and the domain name, and
    instructions for processing subsequent requests for the resource based on the stored level of risk.

9. The system of claim 7, wherein processing the request based on the assessed level of risk involves:
    if the assessed level of risk exceeds a pre-specified threshold, delaying or rejecting the request; and
    if the assessed level of risk falls below the pre-specified threshold, enabling processing of the request.

10. The system of claim 7, wherein the one or more properties further comprise at least one of:
    an age of the domain name a similarity of the domain name to a known domain name;
    a certificate type associated with the domain name;
    a subdomain of a known domain name; and
    an existence of the domain name in an anti-phishing database.

11. The system of claim 7, wherein the domain name is associated with a high level of risk if the reverse image search matches the obtained visual representation to an existing visual representation associated with a different domain name.

12. The system of claim 7, wherein the network comprises an intranet.

13. A non-transitory computer-readable storage medium storing instructions that when executed by a computer cause the computer to perform a method for securing a network, the method comprising:
    obtaining a request for a resource from a client connected to the network;
    using a domain name from the request to obtain one or more properties associated with the domain name, wherein the one or more properties comprise a visual representation of the resource, and wherein obtaining the visual representation of the resource involves:
        transmitting a request for the resource over an external network;
        receiving the resource; and
        generating a rendered screenshot of the received resource;
    assessing a level of risk associated with the domain name based on the one or more properties, wherein assessing the level of risk involves:
        performing a reverse image search by comparing the rendered screenshot to a database of rendered screenshots of websites, each of the websites associated with a different domain name that is different from the domain name from the request;
        determining the level of risk based on the reverse image search; and
        calculating the level of risk as a sum of numerical risk values associated with the one or more properties; and
    processing the request based on the assessed level of risk.

14. The computer-readable storage medium of claim 13, the method further comprising:
    storing the level of risk and the domain name; and
    processing subsequent requests for the resource based on the stored level of risk.

15. The computer-readable storage medium of claim 13, wherein processing the request based on the assessed level of risk involves:
    if the assessed level of risk exceeds a pre-specified threshold, delaying or rejecting the request; and
    if the assessed level of risk falls below the pre-specified threshold, enabling processing of the request.

16. The computer-readable storage medium of claim 13, wherein the one or more properties further comprise at least one of:
    an age of the domain name a similarity of the domain name to a known domain name;
    a certificate type associated with the domain name;
    a subdomain of a known domain name; and
    an existence of the domain name in an anti-phishing database.

17. The method of claim 1, further comprising:
    when the comparing matches the rendered screenshot to a rendered screenshot from the rendered screenshots, setting the level of risk to a value that indicates that the domain name is associated with a high level of risk.

* * * * *